United States Patent
Nishibata et al.

(10) Patent No.: US 9,716,452 B2
(45) Date of Patent: Jul. 25, 2017

(54) ROTATION ANGLE CALCULATION DEVICE

(71) Applicant: DENSO CORPORATION, Kariya (JP)

(72) Inventors: Koichi Nishibata, Kariya (JP); Junichi Fukuta, Kariya (JP); Yusuke Shindo, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/092,719

(22) Filed: Apr. 7, 2016

(65) Prior Publication Data

US 2016/0301336 A1  Oct. 13, 2016

(30) Foreign Application Priority Data

Apr. 8, 2015  (JP) .................. 2015-079636

(51) Int. Cl.
*H02P 6/16* (2016.01)
*G01D 5/20* (2006.01)

(52) U.S. Cl.
CPC ............. *H02P 6/16* (2013.01); *G01D 5/2073* (2013.01); *H02P 2203/00* (2013.01)

(58) Field of Classification Search
CPC ....................................................... H02P 6/16
USPC .............................. 318/400.04, 400.01, 700
See application file for complete search history.

(56) References Cited

U.S. PATENT DOCUMENTS

| 5,528,114 A | * | 6/1996 | Tokizaki | ........... H02M 7/53873 318/34 |
| 6,191,550 B1 | * | 2/2001 | Yoshihara | ............. B60L 3/0023 318/638 |
| 2014/0361720 A1 | * | 12/2014 | Miyachi | .................. H02P 29/50 318/400.39 |

FOREIGN PATENT DOCUMENTS

JP  2009-145273 A  7/2009

* cited by examiner

*Primary Examiner* — David S Luo
(74) *Attorney, Agent, or Firm* — Oliff PLC

(57) ABSTRACT

An ECU has a function of calculating a rotation angle, which is used for torque control, based on amplitude-modulated signals SIN and COS outputted from an angle sensor and a synchronous detection signal. Frequency components generated at the time of switching operation of switching elements of an inverter connected to a motor-generator is included in an output voltage of the inverter. The ECU has a function of shifting frequencies of the frequency components and an excitation frequency of an excitation signal from each other so that noise having the frequencies of the frequency components are not superimposed on the amplitude-modulated signals SIN and COS.

12 Claims, 8 Drawing Sheets

1

ROTATION ANGLE CALCULATION DEVICE

CROSS REFERENCE TO RELATED APPLICATION

This application is based on Japanese patent application No. 2015-79636 filed on Apr. 8, 2015.

FIELD

The present disclosure relates to a rotation angle calculation device for a system having a rotation angle detector, which receives an excitation signal varying with an excitation frequency and outputs an amplitude-modulated signal by modulating an amplitude of the excitation signal in correspondence to a rotation angle of a rotary electric machine.

BACKGROUND

JP 2009-145273 A discloses a resolver as a rotation angle detector, which receives an excitation signal and outputs an amplitude-modulated signal by modulating an amplitude of the excitation signal in correspondence to a rotation angle of a rotary electric machine. The rotation angle of the rotary electric machine is calculated by performing synchronous detection on the amplitude-modulated signal outputted from the resolver. The rotary electric machine is controlled by turning on and off switching elements of a power converter electrically connected to the rotary electric machine in correspondence to the calculated rotation angle.

The amplitude-modulated signal outputted from the resolver is likely to be superimposed with noise, which has frequency components around an excitation frequency of the excitation signal. It is difficult to remove the noise from the amplitude-modulated signal. If the noise is not removed, the rotation angle cannot be calculated with high accuracy.

SUMMARY

It therefore an object to provide a rotation angle calculation device, which calculates a rotation angle of a rotary electric machine with high accuracy.

According to one aspect, a rotation angle calculation device is provided for a system including a rotation angle detector, which receives an excitation signal variable with an excitation frequency and outputs an amplitude-modulated signal by modulating an amplitude of the excitation signal with a rotation angle of a rotary electric machine so that the rotary electric machine is controlled by switching operations of switching elements of a power converter electrically connected to the rotary electric machine. The rotation angle calculation device comprises an angle calculation part and a shift part. The angle calculation part calculates the rotation angle, which is used to control the rotary electric machine, based on the amplitude-modulated signal outputted from the rotation angle detector and a synchronous detection signal. The shift part performs shift processing for shifting frequencies of frequency components, which are included in an output voltage of the power converter and generated at time of switching operations of the switching elements, and the excitation frequency from each other.

DETAILED DESCRIPTION OF EMBODIMENT

A rotation angle calculation device will be described with reference to various embodiments shown in the accompanying drawings. The rotation angle calculation device is implemented in a vehicle having a rotary electric machine (motor-generator) as a main in-vehicle machine.

(First Embodiment)

Figure 1:
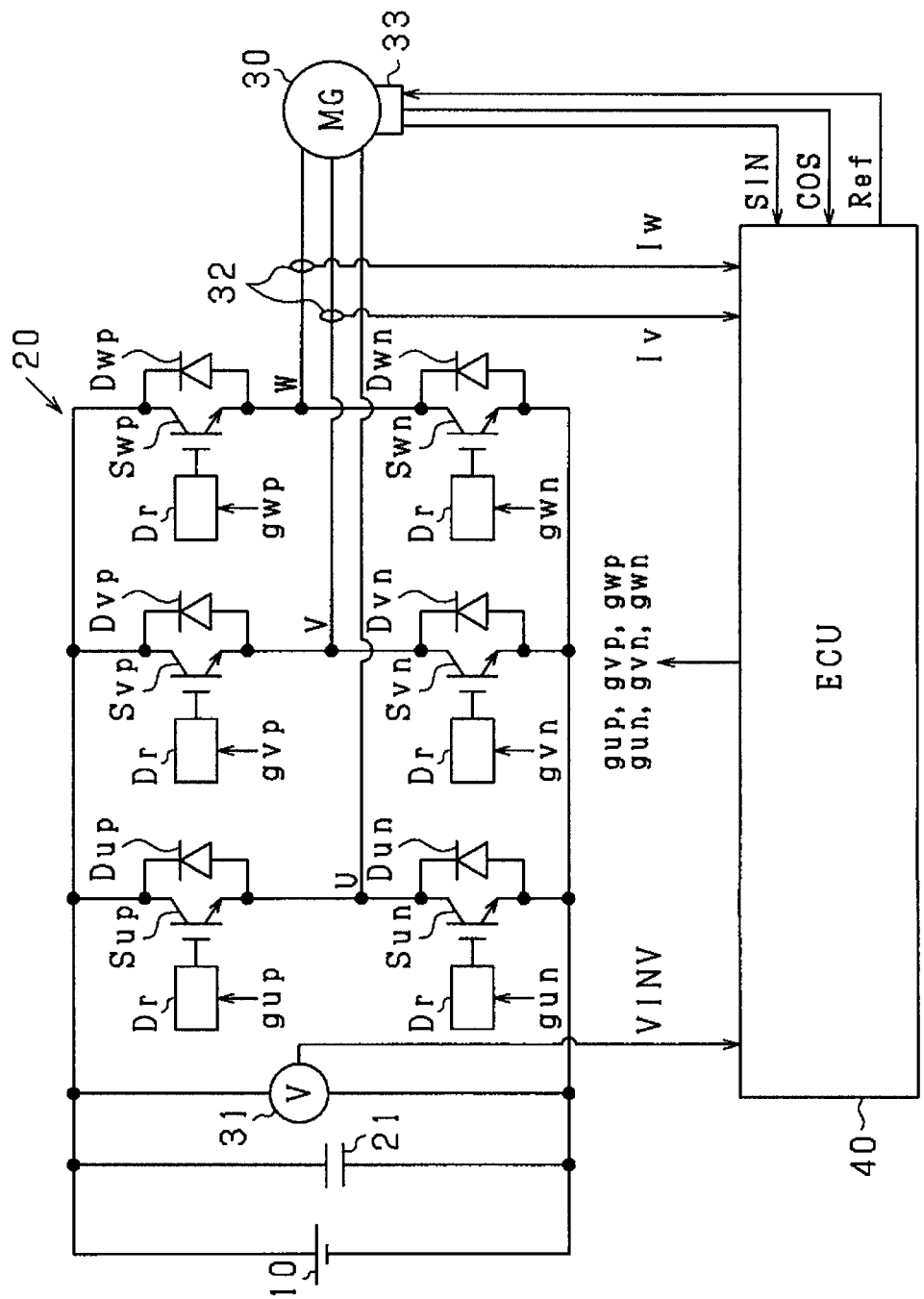
FIG. 1 is an overall structural diagram of a motor control system including a rotation angle calculation device according a first embodiment.

In a first embodiment, as shown in FIG. 1, a motor control system includes a high voltage battery 10, an inverter 20, a motor-generator 30 and an electronic control unit (ECU) 40. The motor-generator 30 is a main in-vehicle machine, which transfers motive power to driving wheels (not shown) of a vehicle. The motor-generator 30 is connected electrically to the high voltage battery 10 though the inverter 20. A synchronous motor of a permanent-magnet type is used as the motor-generator 30. More specifically, the synchronous motor is an interior permanent magnet type (IPMSM), which is a salient pole machine. The high voltage battery 10 is a storage battery, which provides an inter-terminal voltage of, for example, more than 100V. The high voltage battery 10 is, for example, a lithium-ion battery or a nickel-metal hydride battery. A boost-buck converter may be provided between the high voltage battery 10 and the inverter 20.

The inverter 20 includes three sets of series connections of switching elements, which are positive arm switching elements Sup, Svp, Swp and negative arm switching elements Sun, Svn, Swn of U, V, W-phases, connected in series, respectively. The positive arm switching elements Sup, Svp, Swp are provided at a high-potential side of the high voltage battery 10 and the negative side switching elements Sun, Svn, Swn are provided at a low-potential side of the high voltage battery 10. Each series connection is connected to a capacitor 21 in parallel. One ends of U, V, W-phase coils of the motor-generator 30 are connected to nodes of the three sets of series connections, respectively. Each of the switching elements Sup to Swn is a voltage-controlled semiconductor switching element, specifically, IGBT. Free-wheeling diodes Dup, Dun, Dvp, Dvn, Dwp and Dwn are connected to the switching elements Sup, Sun, Svp, Svn, Swp and Swn, respectively, in parallel and in reverse-biased fashion. Each of the switching elements Sup to Swn may be a MOSFET.

The control system described above includes a voltage sensor 31, current sensors 32 and an angle sensor 33. The voltage sensor 31 is a voltage detection part, which detects an inter-terminal voltage of the capacitor 21 as a power supply voltage of the inverter 20. The current sensors 32 are current detection parts, which detect phase currents flowing to the motor-generator 30 as currents in a three-phase fixed coordinate system. The current sensors 32 detect at least two phase currents among three phase currents. For example, the current sensors 32 detect two phase currents, that is, a V-phase current and a W-phase current.

The angle sensor 33 is a sensor, which detects a rotation angle of the motor-generator 30. A resolver is used as the angle sensor 33. Specifically, the resolver is a one-phase excitation two-phase output type, which has one primary coil and first and second secondary coils. The primary coil is connected to a rotor of the motor-generator 30. The primary coil is excited by an excitation signal Ref, which is in a sine waveform outputted from the ECU 40. Magnetic flux generated in the primary coil by the excitation signal Ref interlinks the first and second secondary coils. The positional relation between the primary coil and the first and second secondary coils varies periodically in accordance with the rotation angle θ of the rotor. For this reason, the number of magnetic flux, which interlinks the first and second secondary coils, varies periodically. The primary coil and the first and second secondary coils are located so that phases of the voltages, which are generated in the first and second secondary coils, are different by an angle of π/2 each other. Thus, assuming that the number of poles of the resolver is, for example, 1, the output voltages of the first and second secondary coils have modulated waveforms, which result from modulation of the excitation signal by modulation waves sin θ and cos θ, respectively. Specifically, assuming that the excitation signal Ref is sin Ωt, the modulated waves become sin θ×sin Ωt and cos θ×sin Ωt. The output voltages of the first and second secondary coils are denoted as amplitude-modulated signals SIN and COS below.

The ECU 40 controls the inverter 20 based on the detection value of each sensor so that a control quantity (torque) of the motor-generator 30 equals a command value (command torque). Specifically, the ECU 40 outputs driving signals gup, gun, gyp, gvn, gwp and gwn to driving circuits Dr provided individually in correspondence to each switching element Sup to Swn so that each switching element Sup, Sun, Svp, Svn, Swp and Swn of the inverter 20 is turned on and off. The driving signals gup, gyp and gwp applied to the positive arm switching elements and the driving signals gun, gvn and gwn applied to the negative arm switching elements are complementary (specifically, high-level logic signal H or low-level logic signal L), respectively. That is, the positive arm switch Sup, Svp and Swp and the negative arm switching elements Sun, Svn and Swn are turned on alternately.

The high voltage battery 10, inverter 20 and motor-generator 30 form an in-vehicle high voltage system and the ECU 40 forms an in-vehicle low voltage system, which is electrically insulated from the high voltage system.

Figure 2:
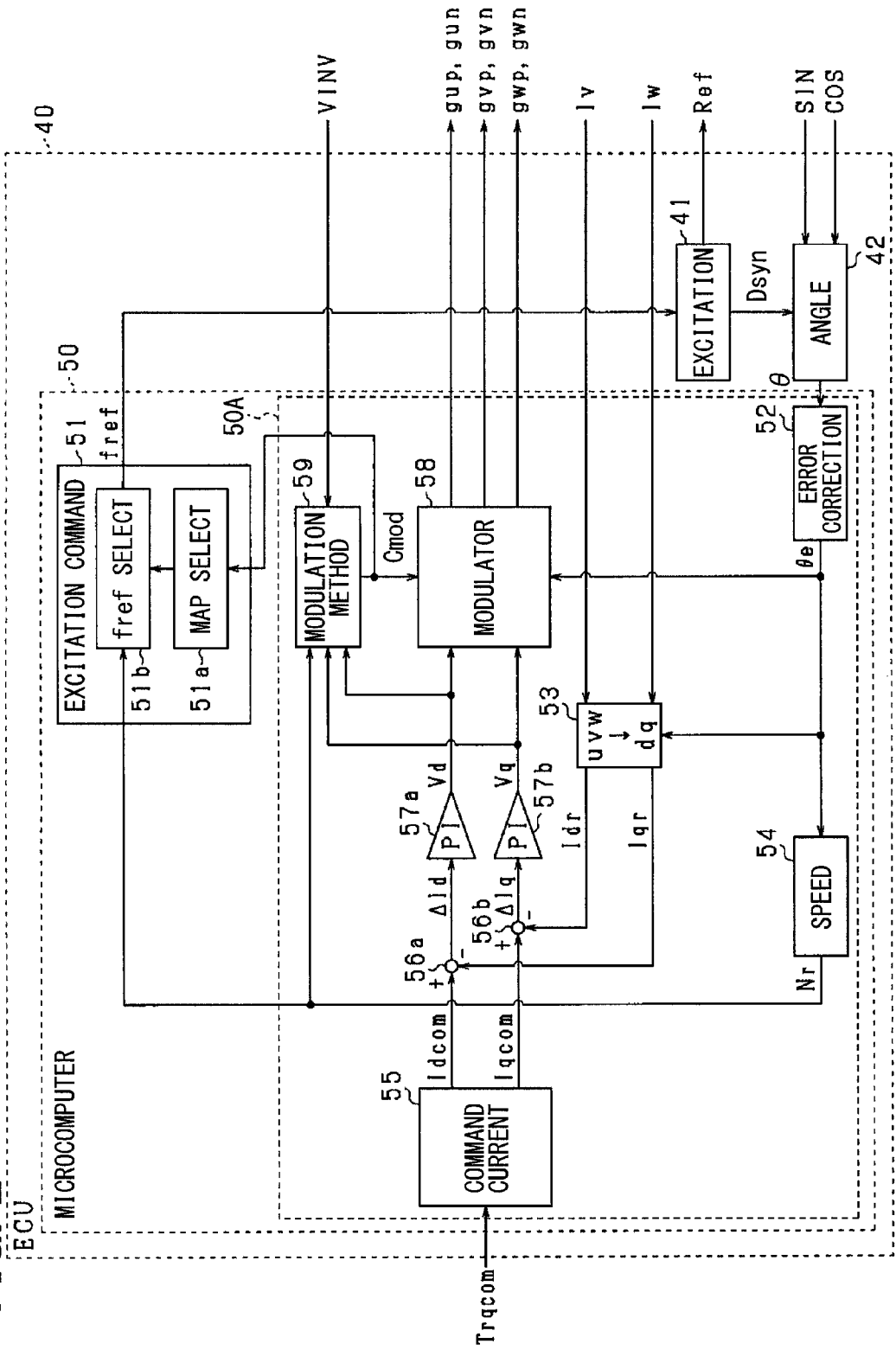
FIG. 2 is a block diagram showing processing of an ECU shown in FIG. 1.

Torque control for the motor-generator 30 executed by the ECU 40 will be described next with reference to FIG. 2. In the first embodiment, current feedback control is exemplified.

The ECU 40 includes a microcomputer 50, an excitation signal generator 41 and an angle calculator 42 as an angle calculation part. The microcomputer 50 includes a control part 50A, which controls the inverter 20, and an excitation command generator 51, which is provided as a shift part (excitation frequency varying part). The excitation signal generator 41 generates the excitation signal Ref in a sine waveform, which has an excitation command frequency fref as a variable frequency outputted from the excitation command generator 51 provided in the microcomputer 50. The excitation signal generator 41 outputs the excitation signal Ref to the primary coil of the resolver, which forms the angle sensor 33. The excitation signal generator 41 outputs a synchronous detection signal Dsyn to the angle calculator 42. The synchronous detection signal Dsyn has the same frequency and phase as the excitation signal Ref has.

The angle calculator 42 calculates a resolver angle θ, which is an angle detected by the angle sensor 33, by performing the synchronous detection processing on the amplitude-modulated signals SIN and COS by using the synchronous detection signal Dsyn outputted from the excitation signal generator 41. The calculated resolver angle θ is inputted into an error correction part 52 provided in the microcomputer 50. The error correction part 52 calculates a corrected electrical angle θe based on the resolver angle θ. The error correction part 52 will be described below.

Figure 3:
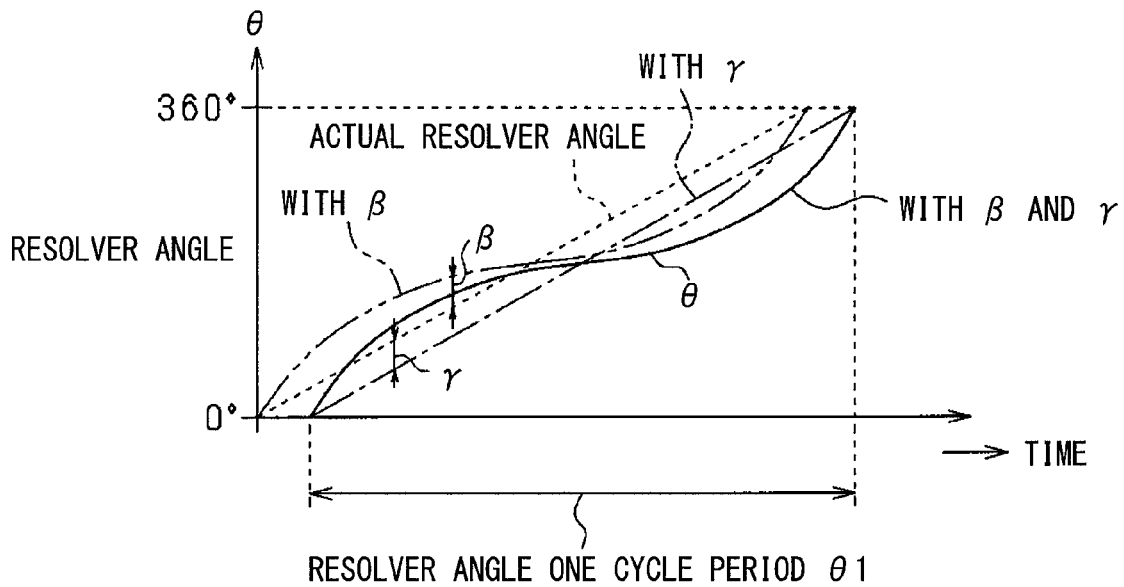
FIG. 3 is a chart showing an error included in a resolver angle.

Referring to FIG. 3, errors included in the resolver angle θ will be described. FIG. 3 shows a change of the resolver angle θ when the motor-generator 30 rotates at a fixed speed. The errors include a variable error β and a delay error γ. The variable error β will be described first. The variable error β is an error in a sine waveform having a period, which is as long as integer times as that of the resolver angle θ1. The resolver angle θ, which includes the variable error β, corresponds to a sum of an actual resolver angle indicated with a broken line and the variable error β superimposed on the actual resolver angle. In FIG. 3, a change of the resolver angle θ is exemplarily shown with a two-dot chain line, assuming that the variable error β having the same cycle period as that of the resolver angle θ is included in the actual resolver angle (broken line).

The delay error γ will be described next. The resolver angle θ, which includes the delay error γ, is delayed by an amount of predetermined angle from the actual resolver angle (shown with broken line). More specifically, when the delay error γ is included in addition to the variable error β, which has the same cycle period as that of the resolver angle θ1, the resolver angle θ corresponds to a sum of a resolver angle, which is delayed from the actual resolver angle by the predetermined angle, and the variable error β, which is superimposed on the delayed resolver angle.

Referring to FIG. 2 again, the error correction part 52 removes the variable error β and the delay error γ from the resolver angle θ and calculates the electrical angle θe of the motor-generator 30 based on the resolver angle θ, from which error is removed. A method of removal of the variable error β and the delay error γ will not be described in detail, because it is not an essential part.

In the microcomputer 50, a two-phase conversion part 53 converts the U-phase current Iu, the V-phase current Iv and the W-phase current Iw in the three-phase fixed coordinate system into a d-axis current Idr and a q-axis current Iqr in a two-phase rotating coordinate system (d-q coordinate system) based on the V-phase current Iv and the W-phase current Iw detected by the current sensors 32.

A speed calculator 54 calculates a rotation speed Nr of the motor-generator 30 (rotor) based on the electrical angle θe outputted from the error correction part 52.

A command current setting part 55 sets a d-axis command current Idcom and a q-axis command current Iqcom based on a command torque Trqcom. The d-axis command current Idcom and the q-axis command current Iqcom are set by using a data map, in which the command torque Trqcom, the d-axis command current Idcom and the q-axis command current Iqcom are stored in advance. A d-axis deviation calculation part 56a calculates a d-axis current deviation ΔId by subtracting the d-axis current Idr from the d-axis command current Idcom set by the command current setting part 55. A q-axis deviation calculation part 56b calculates a q-axis current deviation ΔIq by subtracting the q-axis current Iqr from the q-axis command current Iqcom set by the command current setting part 55.

A d-axis command voltage calculation part 57a calculates, as an operation value for feedback control (proportional and integral control) of the d-axis current Idr to the d-axis command current Idcom, a d-axis command voltage Vd based on the d-axis current deviation ΔId. A q-axis command voltage calculation part 57b calculates, as an operation value for feedback control (proportional and integral control) of the q-axis current Iqr to the q-axis command current Iqcom, a q-axis command voltage Vq based on the q-axis current deviation ΔIq.

A modulator 58 generates the driving signals gup, gun, gyp, gvn, gwp and gwn for the switching elements Sup, Sun, Svp, Svn, Swp and Swn, respectively, based on the d-axis command voltage Vd, q-axis command voltage Vq, electrical angle θe and a modulation command Cmod outputted from a modulation method command part 59. The modulator 58 outputs these driving signals to the corresponding driving circuits Dr for the switching elements Sup to Swn.

In the first embodiment, a PWM method or a pulse pattern method is selected as a driving signal generation method. The PWM method will be described first. The PWM method is used in a case that, a modulation rate M is equal to or less than a predetermined value (for example, 1.15), for example. The modulation rate M is calculated by a modulation method command part 59. Specifically, the modulation method command part 59 calculates an amplitude of a voltage vector (referred to as a voltage amplitude Vn below) of the inverter 20 based on the d-axis command voltage Vd and the q-axis command voltage Vq. The modulation method command part 59 further calculates the modulation rate M by standardizing the calculated voltage amplitude Vn a battery voltage VINV detected by the voltage sensor 31.

The modulator 58 first calculates the U-phase, V-phase and W-phase command voltages, which are phase-shifted by 120° one another in electrical angle in the three-phase fixed coordinate system based on the d-axis command voltage Vd, q-axis command voltage Vq and the electric angle θe. The modulator 58 then generates the driving signals gup, gun, gyp, gvn, gwp and gwn based on results of comparison of a carrier signal (for example, a triangular wave signal), which has a carrier frequency fc as a variable frequency outputted from the modulation method command part 59 as a modulation command Cmod, with the U-phase voltage, V-phase voltage and the W-phase voltage.

The pulse pattern method will be described next. The pulse pattern method according to the first embodiment is used in a case of an over-modulation region, in which the modulation rate M is greater than the predetermined value. The modulation method command part 59 stores as map data a waveform (pulse pattern) of each driving signal in one cycle period of electrical angle θe with respect to each modulation rate M. The modulation method command part 59 selects a pulse pattern, which corresponds to the calculated modulation rate M, and outputs the selected pulse pattern to the modulator 58 as the modulation command Cmod. The modulator 58 generates the driving signals gup, gun, gyp, gvn, gwp and gwn by setting output timing of the pulse pattern based on a voltage phase δ. The voltage phase δ may be calculated based on the d-axis command voltage Vd and the q-axis command voltage Vq.

The motor-generator 30 may be controlled by torque feedback, for example, in place of the current feedback.

The output voltage of the inverter 20 (specifically, interterminal voltage, for example) includes frequency components corresponding to switching of the switching elements Sup to Swn, which form the inverter 20. In the first embodiment, the frequency components included in the output voltage in correspondence to switching operations of the switching elements Sup to Swn are a fundamental wave component and components having a frequency of n×fc+k×f1 of the output voltage in a case of the PWM method. In the first embodiment, frequencies 2×fc±f1 and fc±2×fcw are considered as components, which are particularly influential. Here, "k" and "n" are integers and f1 is a frequency of the fundamental wave component of the output voltage.

In a case of the pulse pattern method, the frequency components included in the output voltage are the fundamental wave component and odd-numbered multiple components of the fundamental wave component. The odd-numbered multiple components exclude multiples of three of the fundamental wave component among low-order harmonic components. In the first embodiment, frequencies of fifth order, seventh order, eleventh order and thirteenth order are considered as components, which are particularly influential.

When the output voltage of the inverter 20 includes the frequency components described above, noise of such frequency components is superimposed on the amplitude-modulated signals SIN and COS. In this case, the accuracy of calculation of the resolver angle θ (electrical angle θe) is lowered and hence torque control for the motor-generator 30 is also lowered.

For this reason, in the first embodiment, an excitation command generation part 51 operates as a shift part, which shifts the excitation command frequency fref, for shifting the excitation frequency of the excitation signal Ref from the frequencies of the frequency components described above. Specifically, the excitation command generation part 51 includes a map selection part 51a and an excitation frequency selection part 51b. The map selection part 51a notifies the excitation frequency selection part 51b of the generation method of the present driving signal, that is, either one of the PWM method and the pulse pattern method, based on the modulation command Cmod outputted from the modulation method command part 59. The excitation frequency selection part 51b varies the excitation command frequency fref based on the generation method of the driving signal and the rotation speed Nr calculated by the speed calculator 54. Processing of the excitation frequency selection part 51b will be described below with respect to each of the PWM method and the pulse pattern method.

This processing will be described in a case of the PWM method first.

When the excitation frequency selection part 51b determines that the present driving signal is generated by the PWM method, it selects a first excitation frequency map, in which the excitation command frequency fref in the PWM method and the rotation speed Nr are correlated in advance, so that the frequencies 2×fc±f1 and the fc±2×f1 of the frequency components included in the output voltage deviate from the excitation command frequency fref. The first excitation frequency map is stored in a storage part (memory), which is provided in the ECU 40 although not shown. It is possible to determine in advance the first excitation frequency map because a method for calculating the frequencies of the frequency components is determined in correspondence to the driving signal generation method. Among the frequencies of frequency components, 2×fc+f1 and fc+2×f1 among the frequencies of the frequency components increase with an increase in the rotation speed Nr and 2×fc−f1 and fc−2xf1 decrease with a decrease in the rotation speed Nr. In the first embodiment, the excitation command frequency fref is set to a first excitation frequency fr1 when the rotation speed Nr is lower than a threshold speed Nα and set to a second excitation frequency fr2, which is lower than the first excitation frequency fr1, when the rotation speed Nr is equal to or higher than the threshold speed Nα.

When the excitation frequency selection part 51b determines that the rotation speed Nr is lower than the threshold speed Nα, it selects the first excitation frequency fr1 as the excitation command frequency fref. When the excitation frequency selection part 51b determines that the rotation speed Nr is equal to or higher than the threshold speed Nα, it selects the second excitation frequency fr2 as the excitation command frequency fref. The excitation frequency selection part 51b outputs the selected excitation command frequency fref to the excitation signal generator 41.

Figure 4:
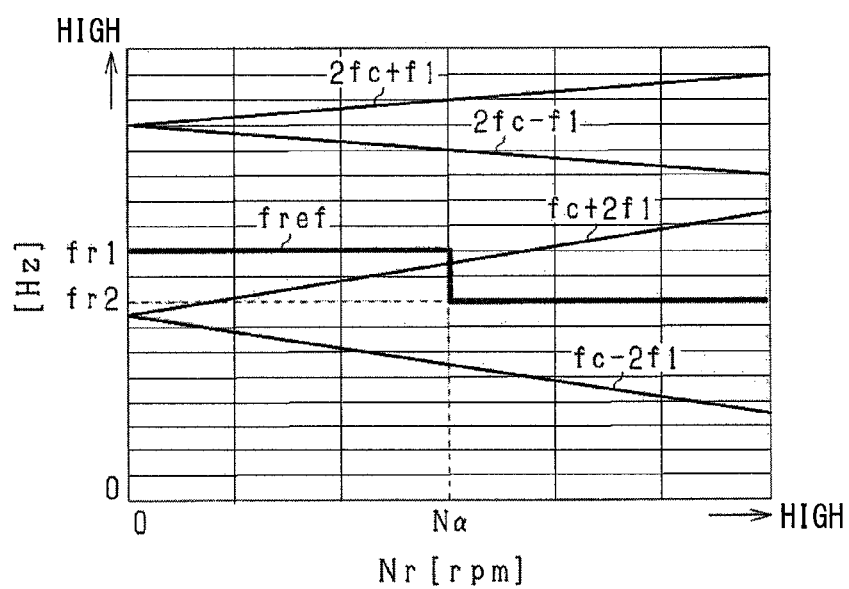
FIG. 4 is a chart showing a method of varying an excitation frequency in a PWM method.
Figure 5:
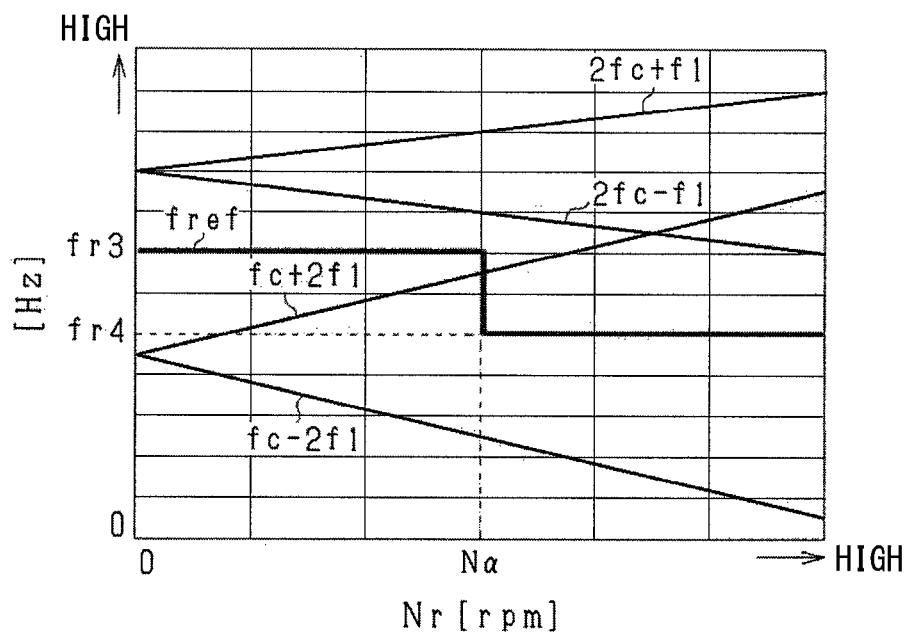
FIG. 5 is a chart showing a method of varying an excitation frequency in a PWM method.
Figure 6:
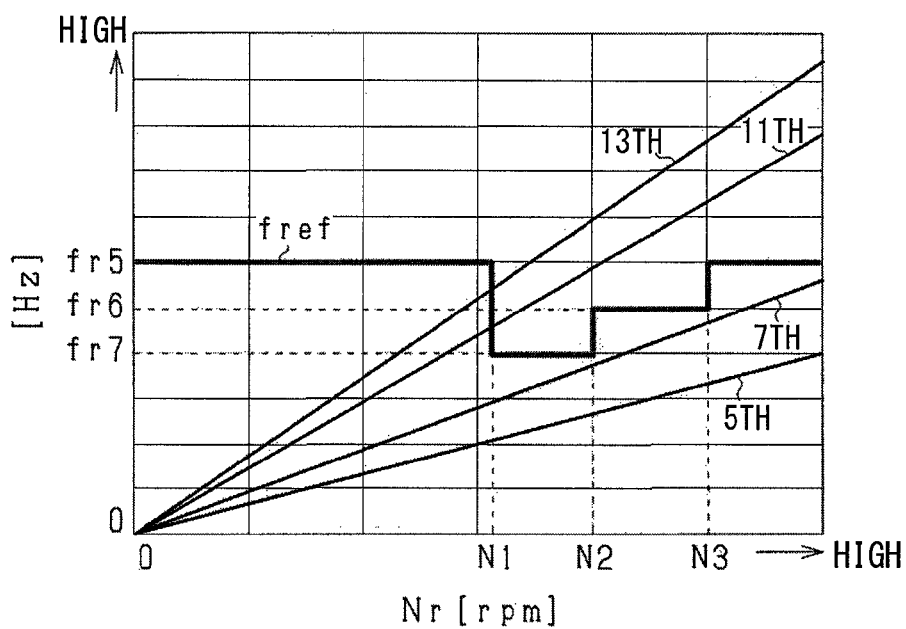
FIG. 6 is a chart showing a method of varying an excitation frequency in a pulse pattern method.

A first excitation frequency map is shown in FIG. 5 as a case that the carrier frequency fc is lower than that shown in FIG. 4. When the excitation frequency selection part 51b determines that the rotation speed Nr is lower than the threshold speed Nα, it selects a third excitation frequency fr3 as the excitation command frequency fref. When the excitation frequency selection part 51b determines that the rotation speed Nr is equal to or higher than the threshold speed Na, it selects a fourth excitation frequency fr4, which is lower than the third excitation frequency f3, as the excitation command frequency fref.

The processing will be described in a case of the pulse pattern method next.

When the excitation frequency selection part 51b determines that the present driving signal is generated by the pulse pattern method, it selects a second excitation frequency map, in which the excitation command frequency fref in the pulse pattern method and the rotation speed Nr are correlated in advance, so that the frequencies of the fifth, seventh, eleventh and thirteenth low-order harmonic component frequencies deviate from the excitation command frequency fref. The second excitation frequency map is also stored in the storage part (memory), which is provided in the ECU 40 although not shown. The frequencies of the fifth, seventh, eleventh and thirteenth low-order harmonic components increase with an increase in the rotation speed Nr. In the embodiment, the excitation command frequency fref is set to a fifth excitation frequency fr5 when the rotation speed Nr is lower than a first threshold speed N1 and set to a seventh excitation frequency fr7, which is lower than the fifth excitation frequency fr5, when the rotation speed Nr is equal to or higher than the first threshold speed N1 and lower than a second threshold speed N2. The excitation command frequency fref is set to a sixth excitation frequency fr6, which is higher than a seventh excitation frequency fr7 and lower than the fifth excitation frequency fr5, when the rotation speed Nr is equal to or higher than the second threshold speed N2 and lower than a third threshold speed N3 and set to the fifth excitation frequency fr5 when the rotation speed Nr is equal to or higher than the third threshold speed N3. The excitation frequency selection part 51b selects the excitation command frequency fref and outputs the selected frequency fref to the excitation signal generator 41.

As described above, according to the first embodiment, the excitation frequency fref is varied with the driving signal generation method and the rotation speed Nr so that the frequencies of the frequency components included in the output voltage deviate from the excitation command frequency fret. Thus it is possible to suppress noise, which has frequencies around the excitation frequency of the excitation signal Ref, from being generated. As a result, it is possible to avoid superimposition of the noise having the frequencies around the excitation frequency on the amplitude-modulated signals SIN and COS and improve the accuracy of calculation of the electrical angle θe. Further, it is possible to avoid overlapping of the noise frequencies and the excitation frequency by simply varying only the excitation command frequency.

The first embodiment may be implemented with the following modifications.

(1) A control system, which generates the driving signal in either one of the PWM method and the pulse pattern method, can be used. In this modification, it is possible to vary the excitation frequency fref by using only the rotation speed Nr without using the modulation command Cmod outputted from the modulation method command part 59.

(2) A rectangular wave control may be used as the driving signal generation method. In this control, the positive-arm switch and the negative-arm switch are turned on once in each cycle period of the electrical angle θe, respectively. In this case, the fifth and seventh low-order harmonic components, for example, are influential in the frequency components included in the output voltage. For this reason, even in the rectangular wave control, the excitation command frequency fref may be varied with the rotation speed Nr so that the excitation command frequency deviates from the frequencies of the low-order harmonic components.

(3) The excitation command frequency fref and the control mode of the inverter 20 may be correlated in advance. For example, in a case that the excitation command frequency fref and the carrier frequency fc are correlated in advance in the PWM method, the excitation command frequency fref may be varied with the carrier frequency fc so that the noise frequencies and the excitation frequency do not overlap. It is noted that the excitation command frequency fref and the carrier frequency fc can be correlated in advance, for example, when the fundamental wave component varies little relative to the components of carrier frequencies fc and 2fc among frequency components included in the output voltage at the time of switching operations of the switching elements Sup to Swn.

(Second Embodiment)

A second embodiment will be described below with respect to differences from the first embodiment. In second embodiment, a method of varying the excitation command frequency fref in the excitation command generation part 51 is changed. In the second embodiment, the excitation command generation part 51 calculates a frequency in the frequency component included in the output voltage at the time of switching operations of the switching elements Sup to Swn and the excitation command frequency fref is set variably so that a difference between the calculated frequencies of the frequency components and the excitation command frequency fref exceeds a predetermined value.

The excitation command generation part 51 calculates the frequencies of the frequency components included in the output voltage based on the modulation command Cmod and the rotation speed Nr. In the case of the PWM method, the frequencies of the frequency components may be calculated based on the carrier frequency fc and the frequency f1 to the fundamental wave component of the output voltage. The frequency f1 of the fundamental wave component may be calculated by the following equation assuming that Pn is the number of pole pairs of the motor-generator 30.

$$f1 = Nr(\text{rpm})/60 \times Pn$$

The frequencies of the frequency components described above may be calculated based on the rotation speed Nr in the case of the pulse pattern method. This is because the low-order harmonic components, which become noises, correspond to the driving signal generation method and the frequencies of the low-order harmonic components correspond to the rotation speed Nr.

According to the second embodiment described above, it is possible to determine the frequencies of the frequency components included in the output voltage based on the modulation command Cmod and the rotation speed Nr. As a result, the excitation command frequency fref can be shifted appropriately from the frequencies of the frequency components described above.

The second embodiment may be implemented with the following modifications.

(1) The frequencies of the frequency components included in the output voltage in the case of the PWM method may be calculated based on only the rotation speed without using the frequency f1 of the fundamental wave component. In this case, the excitation command frequency component fref may be varied so that the excitation command frequency fref is shifted from the calculated frequencies of the frequency components with margins.

(2) A control system, which generates the driving signal in either one of the PWM method and the pulse pattern method, can be used. In this modification, it is possible to calculate the frequencies of the frequency components included in the output voltage by using only the rotation speed Nr.

(3) The rectangular wave control may be used as the driving signal generation method. Even in this case, it is possible to calculate the frequencies of the frequency components included in the output voltage based on the rotation speed Nr.

(4) When it is determined that the calculated frequencies of the frequency components are in a predetermined frequency range, which includes the excitation command frequency fref, the excitation command generation part 51 may vary the excitation command frequency fref to a frequency, which is outside the predetermined frequency range.

(Third Embodiment)

Figure 7:
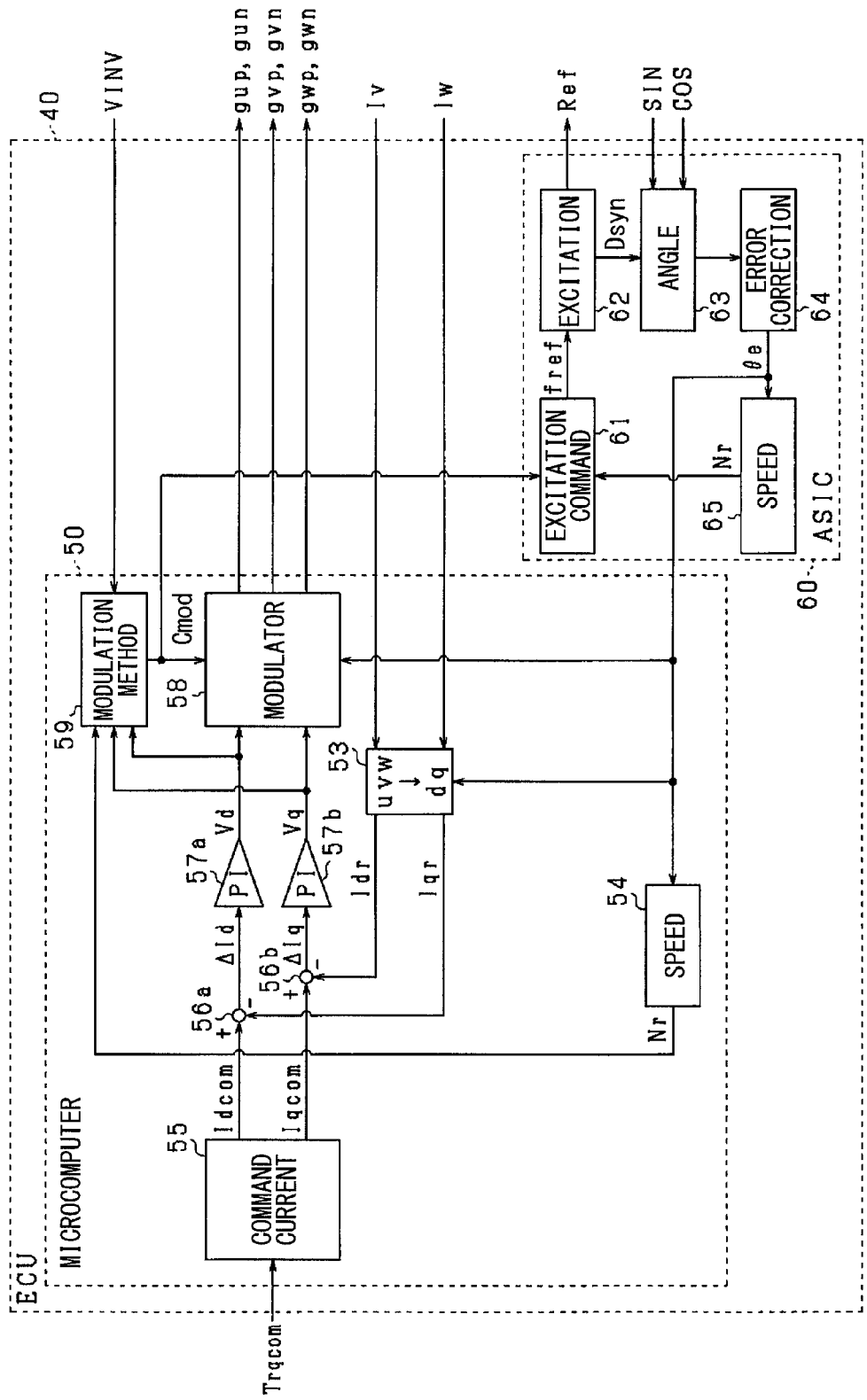
FIG. 7 is a block diagram showing processing of the ECU in a third embodiment.

A third embodiment will be described below with respect to differences from the first embodiment. In the third embodiment, the internal structure of the ECU 40 is changed as shown in FIG. 7. In FIG. 7, the same structural parts as those shown in FIG. 2 are designated with the same reference numerals for simplicity.

As shown in FIG. 7, the ECU 40 includes only one integrated circuit 60. The integrated circuit 60 is formed as an application specific integrated circuit (ASIC), which includes an excitation command generation part 61, an excitation signal generator 62, an angle calculator 63, an error correction part 64 and a speed calculator 65. In the third embodiment, the excitation command generation part 61, the excitation signal generator 62, the angle calculator 63, the error correction part 64 and the speed calculator 65 have the same functions as those of the excitation command generation part 51, the excitation signal generator 41, the angle calculator 42, the error correction part 52 and the speed calculator 54 shown in FIG. 2, respectively.

Thus the integrated circuit 60 is provided with the function of varying the excitation command frequency fref in the third embodiment. Specifically, the integrated circuit 60 is configured to have the excitation command generation part 61, the excitation signal generator 62, the angle calculator 63 and the speed calculator 65. Thus time lag in exchanging signals is shortened and a response speed of angle calculation processing is improved.

The third embodiment may be implemented with a modification that, in the configuration of the third embodiment shown in FIG. 7, the processing of varying the excitation command frequency fref described in the second embodiment may be performed.

(Fourth Embodiment)

Figure 8:
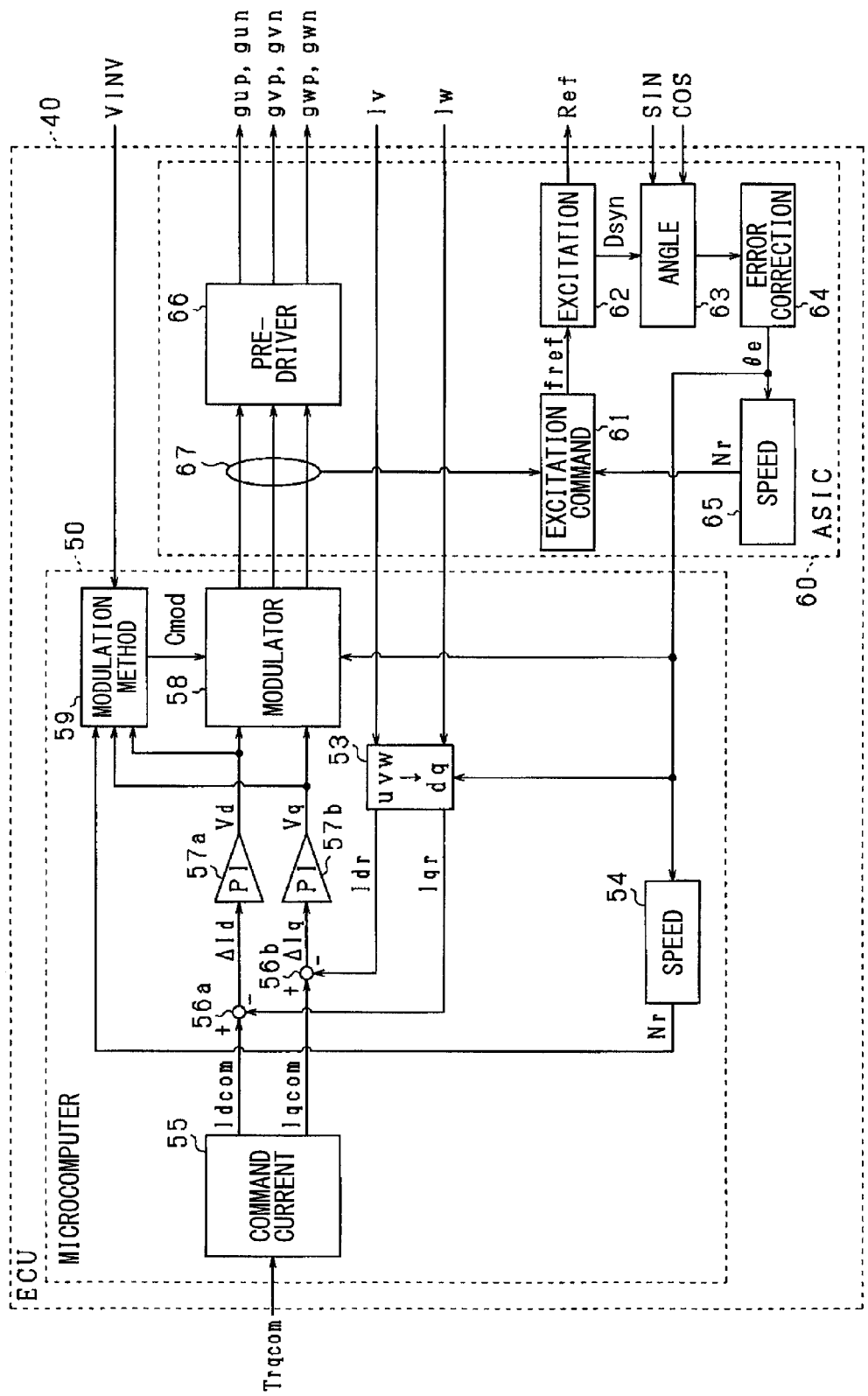
FIG. 8 is a block diagram showing processing of the ECU in a fourth embodiment.

A fourth embodiment will be described below with respect to differences from the third embodiment. In the fourth embodiment, as shown in FIG. 8, the integrated circuit 60 includes a pre-driver part 66 and a gate signal detection part 67. The pre-driver part 66 functions as a buffer circuit, which applies the driving signals gup to gwn generated by the modulator 58 to the switching elements Sup to Swn, respectively. The same structural parts in FIG. 8 as those shown in FIG. 7 are designated with the same reference numerals for simplicity.

The gate signal detection part 67 detects each of the driving signals gup to gwn outputted from the modulator 58. The excitation command generation part 61 calculates frequencies of frequency components, which are included in the output voltage at the time of switching operations of the switching elements Sup to Swn, based on the driving signals detected by the gate signal detection part 67. Specifically, for example, the excitation command generation part 51 may calculates the frequencies of the frequency components by using Fourier transform (specifically, FFT) of the driving signals gup to gwn. The excitation command generation part 51 varies the excitation command frequency fref based on the calculated frequencies of the frequency components in the similar manner as in the third embodiment.

The fourth embodiment also provides the similar advantages as the third embodiment.

(Fifth Embodiment)

A fifth embodiment will be described below with respect to differences from the third embodiment. In the fifth embodiment, in place of the excitation command frequency fref, a method of driving the switching elements Sup to Swn in each driving signal generation method so that the excitation frequency fref of the excitation signal Ref and the frequencies of the frequency components included in the output voltage at the time of switching operations of the switching elements Sup to Swn are shifted.

Figure 9:
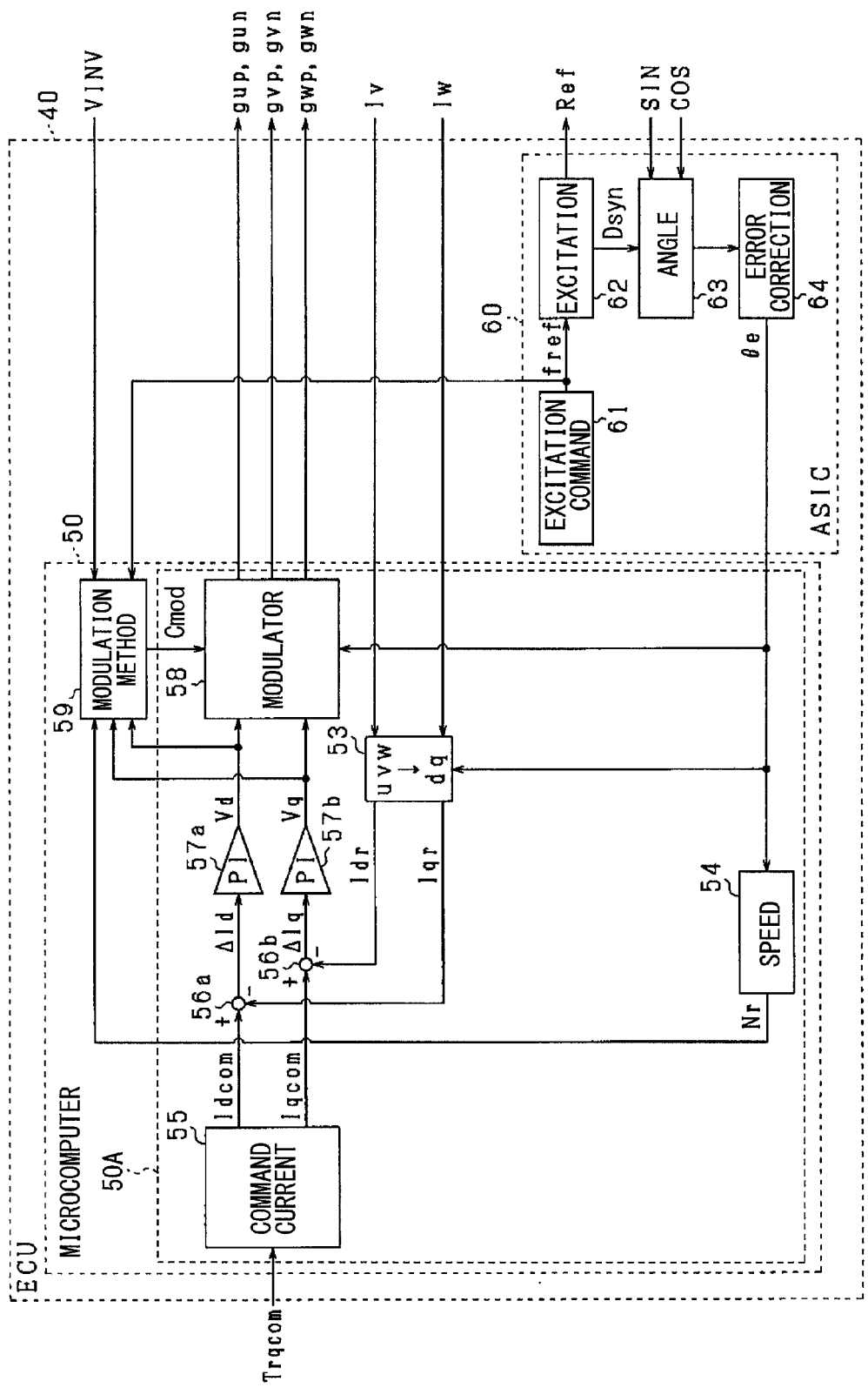
FIG. 9 is a block diagram showing processing of the ECU in a fifth embodiment.

FIG. 9 shows a block diagram showing processing of the ECU 40 in the fifth embodiment. In FIG. 9, the same structural parts as those shown in FIG. 7 are designated with the same reference numerals for simplicity.

In the fifth embodiment, the microcomputer 50 includes the control part 50A for controlling the inverter 20 and the modulation method command part 59 is provided as the shift part (control mode varying part). The integrated circuit 60 provided as an angular position calculation part is not provided with the speed calculator 65. Further, the excitation command frequency fref outputted from the excitation command generation part 61 is set to a fixed value. The excitation command frequency fref is inputted to the modulation method command part 59. The modulation method command part 59 performs processing of varying the method of driving the switching elements Sup to Swn so that the excitation frequency fref of the excitation signal Ref and the frequencies of the frequency components included in the output voltage deviate from each other. The processing of the modulation method command part 59 will be described below with respect to each of the PWM method and the pulse pattern method.

First, the processing case of PWM method will be described.

When the modulation method command part 59 determines that the present method of driving signal generation is the PWM method, it selects a first predetermined map, in which the carrier frequency fc and the rotation speed Nr in the PWM method are predefined, so that the excitation command frequency fref differs from the frequencies 2×fc±f1 and fc±2×f1 of the frequency components included in the output voltage. The first predetermined map is stored in the storage part provided in the ECU 40. The modulation method command part 59 selects the carrier frequency fc based on the first predetermined map and the rotation speed Nr so that the excitation command frequency fref does not equal the frequencies 2×fc±f1 and fc±2×f1. Specifically, the modulation method command part 59 switches over the carrier frequency fc between when the rotation speed Nr is lower than the threshold speed and when the rotation speed Nr is equal to or higher than the threshold speed. The modulation method command part 59 outputs the selected carrier frequency fc to the modulator 58.

Next, the processing case of pulse pattern method will be described.

When the modulation method command part 59 determines that the present method of driving signal generation is the pulse pattern method, it selects a second predetermined map, in which the pulse pattern and the rotation speed Nr in the pulse pattern method are predefined, so that the excitation command frequency fref differs from the frequencies (frequency of low-order harmonics) of the frequency components included in the output voltage. The second predetermined map is also stored in the storage part provided in the ECU 40. The second predetermined map includes plural pulse (for example, two) patterns for each of the modulation rates M. In a case that two patterns are provided, these two patterns commonly use the fundamental wave component of the output voltage of the inverter 20. However, these patterns are set so that one pattern is larger in fifth and seventh components than those of the other pattern but smaller in eleventh and thirteenth components that those of the other pattern.

The modulation method command part 59 selects the pulse pattern based on the second predetermined map, modulation rate M and the rotation speed Nr so that the excitation command frequency fref does not equal the frequencies of the frequency components described above. Specifically, the modulation method command part 59 switches over the pulse patterns, one of which is larger in the fifth and seventh components and the other of which is larger in the eleventh and thirteenth components, between when the rotation speed Nr is lower than the threshold speed and when the rotation speed Nr is equal to or higher than the threshold speed. The modulation method command part 59 outputs the selected carrier pattern to the modulator 58.

As described above, the fifth embodiment also provides the same advantages as the third embodiment.

(Sixth Embodiment)

A sixth embodiment will be described below with respect to differences from the first embodiment. In the sixth embodiment, the processing performed by the modulation method command part 59 is changed. Specifically, the modulation method command part 59 calculates the frequencies of the frequency components included in the output voltage at the time of switching operations of the switching elements Sup to Swn and the driving method for the switching elements Sup to Swn is changed so that a frequency difference between the calculated frequencies of the frequency components and the excitation command frequency fref equals or exceeds a predetermined value. The method of calculating the frequencies of the frequency components is the same as that performed in the second embodiment with respect to each of the PWM method and the pulse pattern method.

In the PWM method, the modulation method command part 59 variably sets the carrier frequency fc so that the frequency difference between the calculated frequencies of the frequency components and the excitation command frequency fref equals or exceeds the predetermined value. In the pulse pattern method, to the contrary, the modulation method command part 59 sets the pulse pattern, which includes the low-order harmonic components so that the frequency difference between the calculated frequencies of the frequency components and the excitation command frequency fref equals or exceeds the predetermined value.

The sixth embodiment also provides the similar advantages provided by the fifth embodiment.

(Other Embodiments)

The embodiments described above may be implemented with the following modifications.

(1) In the second and sixth embodiments, in place of the excitation command frequency fref, a calculation value of the frequency of the excitation signal Ref actually outputted from the excitation signal generator may be used. In this case, the excitation frequency may be extracted by, for example, Fourier transform (specifically, FFT) of the excitation signal Ref. The excitation frequency may alternatively be extracted by detection of zero-crossing of the excitation signal Ref.

Figure 10:
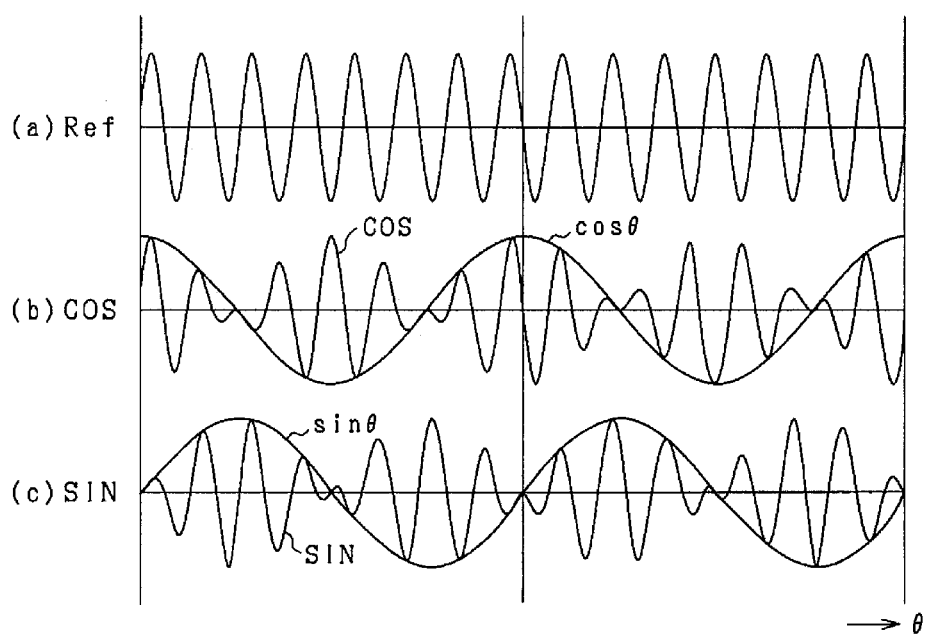
FIG. 10 is a chart showing changes of an excitation signal and an amplitude-modulated signal in a different embodiment.

In addition, in place of the excitation command frequency fref, the amplitude-modulated signals SIN and COS may be used. This is because the amplitude-modulated signals SIN and COS include components, which vary with the excitation frequency. In this case as well, the excitation frequency may be extracted by Fourier transform (specifically FFT) or zero-cross detection. In a case that the amplitude-modulated signals SIN and COS are used, the amplitude-modulated signals SIN and COS alternately become 0 at every predetermined interval as shown in FIG. 10. For this reason, for determining the excitation frequency, either one of the pair of amplitude-modulated signals SIN and COS may be switched over based on the rotation angle θ.

(2) The frequencies of the frequency components included in the output voltage at the time of switching operations of the switching elements Sup to Swn may be calculated by using other methods different from that exemplified in the fourth and fifth embodiments. For example, the frequencies of the frequency components may be calculated based on a detection value of the inter-line voltage, phase voltage or phase current of the inverter 20. Specifically, assuming that the inter-line voltage is used, the frequencies of the frequency components may be extracted by Fourier transform (specifically FFT) of the detected inter-line voltage. In addition, for example, the fundamental wave component may be removed from the detection value of the inter-line voltage by subjecting the detected inter-line voltage to filter processing (low-pass filter processing). The frequencies of the frequency components described above may be extracted by detecting the zero-crossing of the detection value, from which the fundamental wave component is removed.

(3) In each of the embodiments described above, the ECU 40 may be additionally provided with an amplitude regulation function, which regulates the amplitude of the amplitude-modulated signals SIN and COS based on the excitation frequency. Specifically, for example, the amplitude regulation function for regulating the amplitude based on the excitation command frequency fref may be provided in the angle calculator 42 in FIG. 2. This function is provided for the following reasons.

A voltage transformation ratio (=Vout/Vin) between the amplitude Vin of the excitation signal Ref applied to the primary coil of the resolver and the amplitude Vout of the pair of amplitude-modulated signals SIN and COS (specifically amplitude of an envelope indicated as sin θ and cos θ in FIG. 10) may be variable with the excitation frequency. As the transformation ratio decreases, an S/N ratio decreases and an accuracy of rotation angle calculation decreases. To counter this decrease, the amplitudes of the amplitude-modulated signals SIN and COS may be regulated based on the excitation command frequency, for example, so that the transformation ratio may be maintained at a fixed value irrespective of the excitation command frequency fref.

(4) In each of the embodiments described above, the ECU 40 may be configured to have a function of phase regulation for regulating phases of the amplitude-modulated signals SIN and COS based on the excitation frequency. Specifically, for example, the angle calculator 42 may be provided with the function of phase regulation for regulating the phase based on the excitation command frequency fref. This function is provided for the following reason.

The phases of the amplitude-modulated signal SIN and COS relative to phase, which is a reference of the excitation signal Ref, tend to deviate in accordance with the excitation frequency. The accuracy of rotation angle calculation tends to decrease with a decrease in the phase deviation described above. To counter this problem, the phases of the amplitude-modulated signals SIN and COS may be regulated based on the excitation command frequency fref, for example, so that the deviation between the phase of the excitation signal Ref and the phases of the amplitude-modulated signals SIN and COS is reduced to 0 or smaller than a predetermined value irrespective of the excitation command frequency fref.

The ECU 40 may be provided with both of the amplitude regulation function and the phase regulation function.

(5) In place of varying one of the excitation frequency and the frequencies of the frequency components included in the output voltage generated at the time of switching operations of the switching elements Sup to Swn, both of them may be varied.

(6) The motor-generator is not limited to the IPMSM but may be a surface permanent magnet synchronous rotary machine or a wound-field synchronous rotary machine. Further, the motor-generator is not limited to the synchronous rotary machine but may be, for example, an induction rotary . Still further, the motor-generator is not limited to be used as an machine in-vehicle main machine but may be used as other devices such as electric motors for an electrically-driven power steering device and for an electrically-driven compressor of an air-conditioner.

(7) In the embodiments described above, the frequency components included in the output voltage of the inverter 20 generated at the time of switching operations of the switching elements Sup to Swn is assumed to have frequencies higher than the frequency f1 of the fundamental wave component of the output voltage. However, the frequency components may include the fundamental wave component.

What is claimed is:

1. A rotation angle calculation device for a system including a control part for controlling a rotary electric machine by switching operations of switching elements of a power converter electrically connected to the rotary electric machine, and a rotation angle detector, which receives an excitation signal variable with an excitation frequency and outputs an amplitude-modulated signal by modulating an amplitude of the excitation signal with a rotation angle of the rotary electric machine, the rotation angle calculation device comprising:

an angle calculation part for calculating the rotation angle, which is used to control the rotary electric machine, based on the amplitude-modulated signal outputted from the rotation angle detector and a synchronous detection signal; and a shift part for performing shift processing for shifting frequencies of frequency components, which are included in an output voltage of the power converter and generated by switching operations of the switching elements, and the excitation frequency from each other, wherein the shift part is an excitation frequency varying part for varying the excitation frequency, as the shift processing, by an excitation signal generation part, which generates the excitation signal and outputs the excitation signal to the rotation angle detector.

2. The rotation angle calculation device according to claim 1, wherein the excitation frequency varying part varies the excitation frequency based on at least one of a control state of the power converter and a rotation speed of the rotary electric machine.

3. The rotation angle calculation device according to claim 2, further comprising: a speed calculation part for calculating the rotation speed, wherein the excitation frequency varying part varies the excitation frequency based on the rotation speed calculated by the speed calculation part, and the excitation frequency varying part, the excitation signal generation part, the angle calculation part and the speed calculation part are formed in a same integrated circuit.

4. The rotation angle calculation device according to claim 1, further comprising:

an excitation frequency grasping part for grasping the excitation frequency; and an output frequency grasping part for grasping frequencies of the frequency components, wherein the excitation frequency varying part varies the excitation frequency to increase a difference between the excitation frequency grasped by the excitation frequency grasping part and the frequencies of the frequency components grasped by the output frequency grasping part to be equal to or larger than a predetermined value.

5. The rotation angle calculation device according to claim 4, wherein the excitation frequency varying part, the excitation signal generation part and the angle calculation part are formed on a same integrated circuit.

6. The rotation angle calculation device according to claim 1, further comprising: an amplitude regulation part for regulating an amplitude of the amplitude-modulated signal based on the excitation frequency.

7. The rotation angle calculation device according to claim 1, further comprising: a phase regulation part for regulating a phase of the amplitude-modulated signal based on the excitation frequency.

8. A rotation angle calculation device for a system including a control part for controlling a rotary electric machine by switching operations of switching elements of a power converter electrically connected to the rotary electric machine, and a rotation angle detector, which receives an excitation signal variable with an excitation frequency and outputs an amplitude-modulated signal by modulating an amplitude of the excitation signal with a rotation angle of the rotary electric machine, the rotation angle calculation device comprising:

an angle calculation part for calculating the rotation angle, which is used to control the rotary electric machine, based on the amplitude-modulated signal outputted from the rotation angle detector and a synchronous detection signal; and a shift part for performing shift processing for shifting frequencies of frequency components, which are included in an output voltage of the power converter and generated by switching operations of the switching elements, and the excitation frequency from each other, wherein the shift part is an output frequency varying part for varying frequencies of the frequency components, as the shift processing, by varying a control state of the power converter.

9. The rotation angle calculation device according to claim 8, wherein the output frequency varying part varies the frequencies of the frequency components based on at least one of the excitation frequency and a rotation speed of the rotary electric machine.

10. The rotation angle calculation device according to claim 8, further comprising:

an excitation frequency grasping part for grasping the excitation frequency; and an output frequency grasping part for grasping frequencies of the frequency components, wherein the output frequency varying part varies the frequencies of the frequency components to increase a difference between the excitation frequency grasped by the excitation frequency grasping part and the frequencies of the frequency components grasped by the output frequency grasping part to be equal to or larger than a predetermined value.

11. The rotation angle calculation device according to claim 8, further comprising: an amplitude regulation part for regulating an amplitude of the amplitude-modulated signal based on the excitation frequency.

12. The rotation angle calculation device according to claim 8, further comprising: a phase regulation part for regulating a phase of the amplitude-modulated signal based on the excitation frequency.

* * * * *